United States Patent
Guccione et al.

(10) Patent No.: US 8,359,352 B2
(45) Date of Patent: *Jan. 22, 2013

(54) AUTOMATED CONTENT AND BOOKMARK DISTRIBUTION

(75) Inventors: Darren S. Guccione, Wheaton, IL (US); Craig B. Lurey, El Dorado Hills, CA (US); Ryan D. Rouland, Alisoviejo, CA (US)

(73) Assignee: Onlywire, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,347

(22) Filed: Jan. 12, 2012

(65) Prior Publication Data

US 2012/0110124 A1 May 3, 2012

Related U.S. Application Data

(63) Continuation of application No. 12/649,668, filed on Dec. 30, 2009, now Pat. No. 8,161,102.

(51) Int. Cl.
*G06F 15/16* (2006.01)

(52) U.S. Cl. .................... 709/203; 709/205
(58) Field of Classification Search .............. 709/203, 709/205
See application file for complete search history.

(56) References Cited

U.S. PATENT DOCUMENTS

| 7,716,352 B2 | 5/2010 | Leetaru et al. |
| 2002/0133604 A1 | 9/2002 | Khanna et al. |

*Primary Examiner* — Adnan Mirza
(74) *Attorney, Agent, or Firm* — McCracken & Frank, LLC

(57) ABSTRACT

A method of submitting content on behalf of a client to multiple service providers includes the steps of receiving a request from a client to submit content to a plurality of service providers and processing the request utilizing a server. The step of processing includes the steps of retrieving client login information necessary to submit the content to the plurality of service providers, logging on to the service providers using the client login information, if necessary, and submitting the content to the plurality of service providers through a client device. The steps of processing, retrieving, logging on, and submitting are performed automatically by the server after the request is received without additional input from the client.

20 Claims, 3 Drawing Sheets

AUTOMATED CONTENT AND BOOKMARK DISTRIBUTION

CROSS REFERENCE TO RELATED APPLICATIONS

This application is a continuation of U.S. patent application Ser. No. 12/649,668, filed Dec. 30, 2009, which is hereby incorporated by reference herein.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Disclosure

The present disclosure relates to content distribution by publishers or end-users to service providers and, more particularly, to automated content distribution to multiple service providers through a single user interface.

2. Background of the Disclosure

Publishers, such as, bloggers, writers, website owners and developers, business owners, or other creators or distributors of content are constantly looking for ways to increase traffic to their content and drive more users to purchase or consume their products or services. Such content may be hosted on the publisher's website, for example, and may include a piece of information such as a URL, notes, status update, blog post, article, document, image, video, or other media. It is well known and documented extensively that backlinks, e.g., hyperlinks or referrals to the publisher's content, are the root driver for the amount of traffic directed to a website and are crucial for optimal search engine placement and click-through to the website. For this reason, publishers trying to drive traffic to their websites spend a great deal of time distributing the content using a manual re-keying process to submit content to each of a plurality of target services or service providers, e.g., social or business networks such as Facebook, LinkedIn, Twitter, etc., bookmark aggregation services such as Del.icio.us, email providers, instant message services, blogs, websites, and other community or information portals where publishers submit content. This manual re-keying process is time consuming, costly, and inefficient.

Another well-known method to increase traffic and backlinks to a website is to provide website visitors the ability to bookmark and share the content with their friends and co-workers. This method of bookmarking and sharing typically involves providing a hyperlink to an end-user that they may email or bookmark to a single service, e.g., a social network or email address. Publishers can build their own website button or tool to provide their end-users with this bookmarking and sharing feature. However, as with the submission of content by a publisher to multiple service providers, prior bookmarking and sharing buttons or tools only allow a user to submit content to a single service at a time and require the user to manually re-key the content submission for each of a plurality of target services.

SUMMARY OF THE INVENTION

In one example, a method of submitting content on behalf of a client to multiple service providers includes the steps of receiving a request from a client to submit content to a plurality of service providers, and processing the request utilizing a server. The step of processing includes the steps of retrieving client login information necessary to submit the content to the plurality of service providers, logging on to the service providers using the client login information, if necessary, and submitting the content to the plurality of service providers through a client device. The steps of processing, retrieving, logging on, and submitting are performed automatically by the server after the request is received without additional input from the client.

In another example, a system for submitting content on behalf of a client to multiple service providers. The system includes means for receiving a request from a client to submit content to a plurality of service providers and means for retrieving client login information necessary to submit the content to the plurality of service providers. The system also includes means for logging on to the service providers using the client login information, if necessary and means for submitting the content to the plurality of service providers through a client device, wherein no additional input from the client is required to submit the content after the request is received.

In yet another example, an apparatus for submitting content to multiple service providers includes a computer readable medium embodying a computer executable program. The computer executable program includes a first routine that submits a request to a server to submit content to a plurality of service providers, a second routine that receives login information from the server, and a third routine that routes the login information and the content to the service providers via a client device.

DETAILED DESCRIPTION

Figure 1:
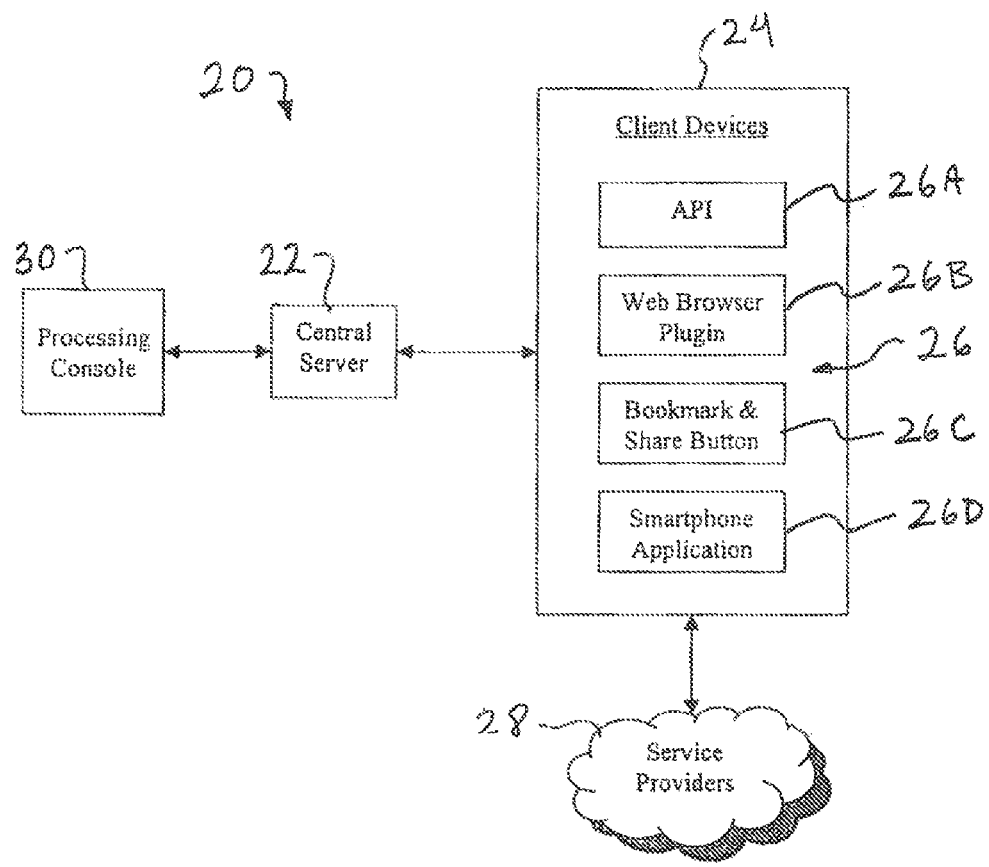
FIG. 1 is a block diagram of a system for automatic content distribution to multiple service providers according to one embodiment.

FIG. 1 illustrates a system 20 that provides for the automatic authentication and submission of content to multiple service providers, simultaneously. In one example, a client or user of the system 20, such as, a publisher or distributor of online content can submit a request to distribute the content to multiple service providers, e.g., various social networking websites and blogs. From the perspective of the publisher, the request is a single request that only requires one set of actions, e.g., clicking a button and optionally entering login information a single time, to submit the content to multiple service providers. In contrast, prior systems required a separate set of actions for each service provider, e.g., clicking a button and entering login information for each of the service providers. After the single request is submitted, no further input from the publisher is required and the content is automatically and simultaneously submitted. In contrast, prior systems submitted content manually and sequentially from the perspective of the publisher, e.g., the publisher clicks a submit button and enters first login information to submit content to a first service provider, then clicks the submit button again and/or enters second login information to submit content to a second service provider, and so forth for each of the service providers.

Referring to FIG. 1, the system 20 according to one embodiment is a distributed hardware and software application network that includes a central server 22, client devices 24, content distribution tools 26, service providers 28, and one or more processing consoles 30. The server 22 can be any suitable combination of hardware, e.g., a computer with processors, memory, network connections, etc., and software stored on the server or otherwise executable by the server, as would be apparent to one of ordinary skill. The various components of the system 20 are configured to communicate to each other through any suitable wired or wireless network, such as, the Internet. Modifications to the system 20 can be made without departing from the spirit of the present disclosure, e.g., the central server and the processing console can be combined into a single unit and/or the content distribution tools need not be integrated into the client devices.

In use, a client, e.g., publishers and end-users, submits a request to distribute content through a content distribution tool 26 associated with a client device 24 or the server 22. Examples of client devices 24 include, for example, a PC or Mac computer or a mobile device. The content distribution tool 26 provides the client with one-click content submission capabilities and is responsible for communication between the server 22, the client device 24, and the service providers 28. In one embodiment, the content distribution tools 26 include a software application installed onto or otherwise executable through the client device 24. In FIG. 1, some specific examples of content distribution tools 26 include an application programming interface ("API") 26A, a web browser plugin 26B, a bookmark and share button 26C, and a smartphone application 26D. The request submitted by the client is routed to the server 22, which processes the request and routes the submitted content through the client device 24 to submit the content to the service providers 28 without a separate re-keying process by the client for each of the service providers. In one embodiment, a visual indicator on the client device 24, e.g., in the client's web browser, informs the client that the content distribution tools 26 are communicating with the service providers 28. There are numerous reasons for this client-server model, such as, to ensure that all content publishing requests originate from the actual user who performed the submission. This reduces potential liability on the part of the owners and operators of the server 22 who did not create the original content. Another reason for the client-server model is to spread out the content submissions among multiple geographic locations, thus spreading out the risk of denial by the service providers 28.

Referring more specifically to FIG. 1, a client submits the request to distribute content to the server via one or more content distribution tools 26 based on the client's technical capabilities and preferences. In one embodiment, the content distribution tools 26 are installed onto at least one client device 24 that is located within the same physical network that the client utilizes to submit the request. The content distribution tools 26 may be written in any programming language and can exist as a standalone application or as a web browser plugin, e.g., the plugin 26B of FIG. 1. One of the benefits of utilizing the web browser plugin 26B is the ability for plugins to utilize pre-existing network proxy servers that are typically employed in an enterprise IT environment. Such web browser plugins 26B can be made available for a number of different browsers, e.g., Firefox and Internet Explorer.

The bookmark & share button 26C is another content distribution tool 26 that can be placed on a client's web pages to provide end-users of the website with the same multi-submission features that the publisher uses to submit content. For example, an end-user can use the bookmark & share button 26C to share the content with multiple services, e.g., social and professional networking sites and emails of their friends or co-workers, in a simultaneous and automated fashion. Providing this functionality to end-users has an exponential impact on the number of backlinks provided to the client's website. The bookmark and share button 26C can be configured to function with any type of webpage as would be apparent to one of ordinary skill.

The API 26A allows clients to submit a request to distribute content to the server directly by transmitting a formatted HTTP query to the server. Such a formatted HTTP query can generally take on the form: http://serveraddress.com/api/add&url_address&title, wherein the query includes an address for the server 22, a website for the content, and a title of the content. However, the HTTP query can take on other forms and include more or less information, as would be apparent to one of ordinary skill in the art. HTTP authentication with a username/password may be required when submitting requests via the API 26A. In other embodiments, different data transfer formats, such as, JSON and XML, can be used without departing from spirit of the present disclosure.

The mobile device or smartphone application 26D is a mobile version of the content distribution tool 26 that is configured to run on smartphone devices, e.g., the iPhone and Android devices. The smartphone application 26D provides clients with the ability to submit content, manage postings, and analyze performance all from a mobile device. The smartphone application 26D performs the same routing of communications between the server 22 and the target services 28 as described above. From the perspective of the server 22, the publisher's mobile device looks just like any other client device 24 that can be utilized for the routing of content distribution requests.

Referring now to the processing console 30, many service providers 28 employ a human verification mechanism, e.g., Captcha, before the content can be submitted. Typical human verification mechanisms limit automation of the content submission process by requiring a user to enter an onscreen password before the submission of the content is accepted. The password can be a series of any characters that is designed to be unreadable by a computer. The processing console 30 provides a mechanism to submit the necessary passwords without requiring further input from the client, as will be described in more detail hereinafter.

Figures 2, 3:
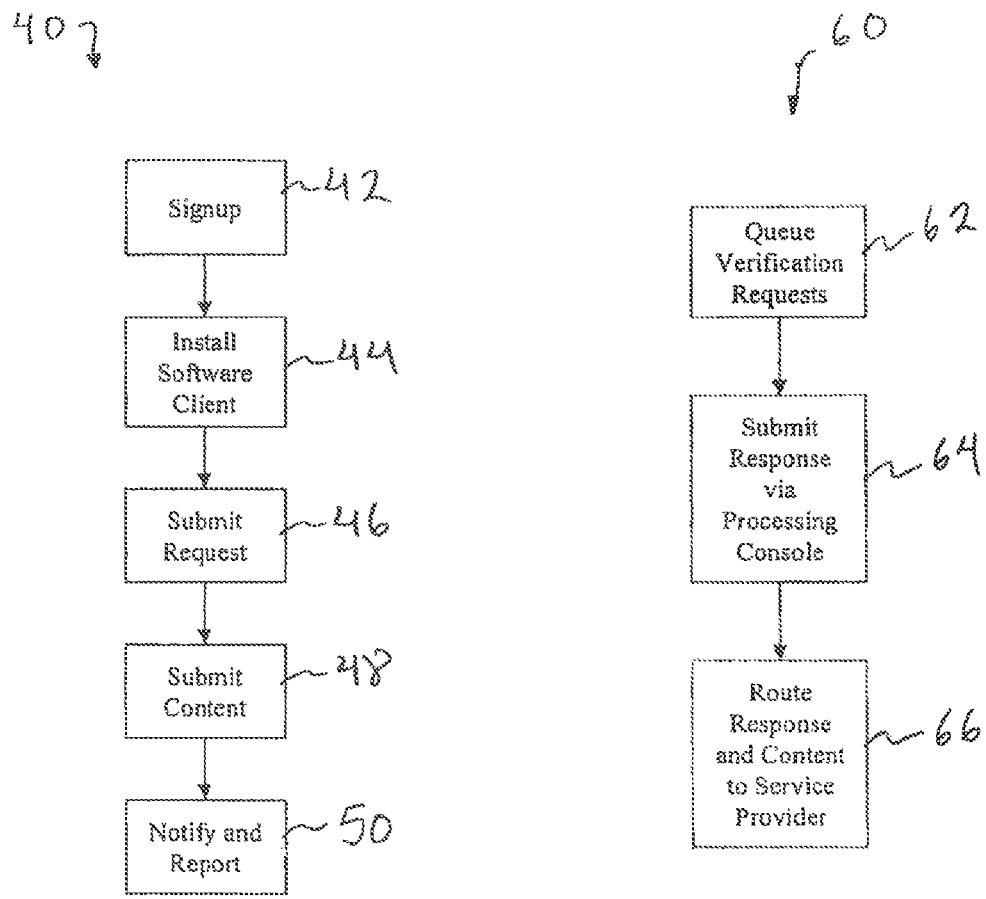
FIG. 2 is a flowchart that illustrates an embodiment of a process that may be performed to automatically distribute content to multiple service providers.
FIG. 3 is a flowchart that illustrates an embodiment of a process that may be performed to submit responses to human verification requests.

FIG. 2 illustrates a process 40 that may be performed in the context of the system 20 of FIG. 1 to automatically submit content to multiple service providers 28. The process 40 begins at a block 42, wherein a client creates an account with the server 22 and provides all of their user names, passwords, and other login information for various service providers 28 to which they wish to submit content. In one embodiment, the client creates an account via a website associated with the system 20 and also enters the login information via the website. The server 22 stores the login information for later retrieval when the content is submitted to the service providers 28. In one embodiment, a list of service providers is provided for the client to choose from. However, the client may also include other service providers that are not included in the list. The account creation process may also include designating separate layers of functionality between internal users. For example, a publisher may employ several writers (i.e. sub-accounts) who submit content to the server 22. A manager of these writers can have access to an administrative login to the server 22 in order to see a submission history and track performance across sub-accounts of the writers, for example. Additionally, the processing console 30 may be required to process human verification requests from a publisher who has multiple content submitters. In this example, the server 22 should understand the hierarchy of the publishers and employees of the publishers in order to process the human verification requests in an efficient and correct manner.

Next, at a block 44, the client installs any necessary software onto their client device 24 to support the content distribution tools 26 described hereinabove. The software can be accessible via the same website through which the client created the account. As discussed previously, such software may include a browser plugin 26B or a bookmark & share button 26C, for example. In one embodiment, the client can customize the appearance of the plugin 26B and the button 26C, as would be apparent to one of skill in the art.

After the client has created an account and has installed any necessary content distribution tools 26, the client is ready to submit a request to distribute content to one or more service providers 28. At a block 46, the client submits such request using any of the content distribution tools 26 described herein. The server 22 processes the request and submits the content to the target service providers 28 on behalf of the client at a block 48. In the present embodiment, the server 22 processes the request to identify the service providers 28 and any client login information necessary to submit the content to the service providers 28. The server 22 can also identify any human verification requests required to submit the content and submit responses to such requests, as will be described in more detail hereinafter. In the present embodiment, the server 22 routes the content through the client device 24 to the target service providers 28, enters the necessary client login information, and responds to any human verification requests to submit the content to the service providers. If no client login information and/or human verification requests are required, then the server can merely route the content to the service providers, as would be apparent to one of skill in the art. The hardware and/or software components of the server 22 can be configured to perform some or all of the steps of processing the request, identifying service providers, identifying and retrieving login information, identifying human verification requests, routing content through the client device, entering client login information, and responding to human verification requests, as would be apparent to one of ordinary skill.

Next, control passes to a block 50 and the server 22 notifies the client via the content distribution tools 26, email, instant message, invoices, etc. when the submission process is complete and if there were any failures and what caused those failures, e.g., incorrect login information and/or incompatible content. The block 50 may also report additional information to the client, e.g., a number of overall submissions, activity levels of sub-accounts within a publisher, pass/fail statics, human verification requests performed, and analytics to monitor and track performance of the content submissions. Such analytics may include a number of backlinks that were created and how much increase in traffic is produced directly or indirectly from the submissions.

FIG. 3 illustrates a process 60 that may be performed to submit responses to human verification requests without requiring further input from the client. The process 60 of FIG. 3 separates the roles of submitting content distribution requests and processing human verification requests by utilizing the processing console 30 to process the human verification requests. In particular, the process 60 of FIG. 3 is performed in conjunction with the system 20 and begins at a block 62, wherein a queue of human verification requests is generated by the server 22. At a block 64, the requests in the queue are dispatched to one or more processing consoles, which are utilized by operators who do not have knowledge of the underlying content submission request. The processing console 30 can be an application executed by an operator's computer that simply queries the operator to type in the displayed password, which can be an image of various characters. At a block 66, the response submitted by the operator is routed to the service provider 28 through the content distribution tool 26 running on the client device 24. In one embodiment, a visual indicator on the client device shows that the request was processed. The processing console 30 is a queue system that allows multiple operators to work on submitting the responses across any geographic location since the transmissions to the service provider 28 are eventually routed through the client device 24. In one embodiment, the operators are asked to response to human verification requests for a client only when the client device 24 is in communication with the server.

Figure 4:
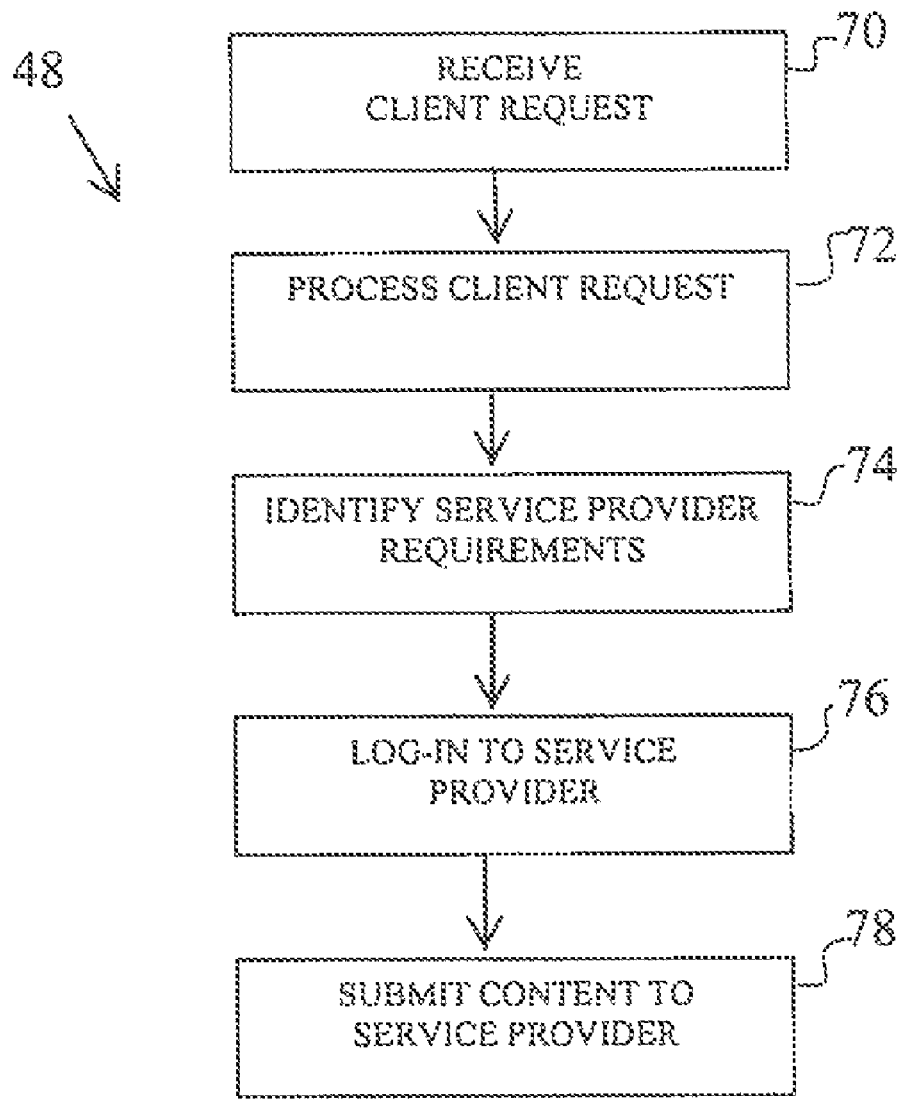
FIG. 4 is a flowchart that illustrates an embodiment of a server of the system of FIG. 1 that automatically distributes content to multiple service providers.

FIG. 4 illustrates an embodiment of the steps undertaken by the server 22 at the block 48 described above. In particular, a block 70 receives a request from the client to submit content to one or more service providers 28. A block 72 processes such request to identify the service provider(s) and any client information necessary to submit the content to such service provider(s). A block 74 identifies any service provider specific requirements, for example, a human verification request described above. A block 76 logs into one of the service provider(s) in accordance with client information identified by the block 72 and the service provider specific requirements identified by the block 74. Thereafter, a block 78 submits content to the service provider. If the client request specifies submitting the content to more than one service provider, the blocks 76 and 78 may be repeated for each additional service provider as would be apparent to one skilled in the art.

INDUSTRIAL APPLICABILITY

The present disclosure provides publishers with the ability to submit content, e.g., web pages, articles, documents, status updates, and other forms of digital content, to multiple service providers through a single user interface.

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out the same. The exclusive right to all modifications within the scope of this disclosure is reserved.

We claim:

1. A method of submitting content on behalf of a client to multiple service providers, the method comprising the steps of:

receiving a request from a client to submit content to a plurality of service providers;

retrieving client login information necessary to submit the content to the plurality of service providers;

logging on to the service providers using the client login information, if necessary; and submitting the content to each of the plurality of service providers through a client device, wherein content submitted to a service provider is formatted in accordance with such service provider, wherein the steps of retrieving, logging on, and submitting are performed automatically by a server after the request is received without additional input from the client.

2. The method of claim 1, further comprising the steps of identifying service providers that include a human verification request before submitting the content, developing a queue of the human verification requests, and submitting responses to the human verification requests through a processing console without additional input from the client, wherein the responses are routed through the client device to the service providers to submit the content.

3. The method of claim 1, further comprising the step of storing client login information by the server.

4. The method of claim 1, further comprising the step of reporting information to the client regarding the status of the request.

5. The method of claim 1, wherein the request is received from a client who has created an account on the server and has submitted the request through a content distribution tool.

6. The method of claim 5, wherein the content distribution tool is a web browser plugin.

7. The method of claim 5, wherein the content distribution tool is a bookmark and share button.

8. The method of claim 5, wherein the content distribution tool is a mobile device application.

9. The method of claim 5, wherein the content distribution tool is an application programming interface.

10. The method of claim 1, wherein the service providers, the server, and the client device are configured to connect to a network, and wherein the step of submitting the content is performed by submitting the content through the network to the service providers.

11. A system for submitting content on behalf of a client to multiple service providers, comprising:
a server that:
receives a request from a client to submit content to a plurality of service providers;
retrieves client login information necessary to submit the content to the plurality of service providers;
logs on to the service providers using the client login information, if necessary; and
submits the content to each of the plurality of service providers through a client device, wherein the content submitted to a service provider is formatted in accordance with such service provider; and
wherein no additional input from the client is required to submit the content after the request is received.

12. The system of claim 11, wherein the server identifies service providers that include a human verification request before submitting the content, develops a queue of the human verification requests, and submits responses to the human verification requests without additional input from the client, wherein the server routes the responses through the client device to the service providers to submit the content.

13. The system of claim 11, wherein the server stores client login information.

14. The system of claim 11, wherein the server is configured to receive the request from a content distribution tool.

15. The system of claim 14, wherein the content distribution tool is a web browser plugin.

16. The system of claim 14, wherein the content distribution tool is a bookmark and share button.

17. The system of claim 14, wherein the content distribution tool is a mobile device application.

18. The system of claim 14, wherein the content distribution tool is an application programming interface.

19. An apparatus for submitting content to multiple service providers, the apparatus including a non-transitory computer readable medium, in which is stored, a computer executable program, the computer executable program comprising:
a first routine that submits a request to a server to submit content to a plurality of service providers;
a second routine that receives login information from the server; and
a third routine that routes the login information and the content to each of the service providers via a client device, wherein the content routed to the service provider is formatted in accordance with the service provider.

20. The apparatus of claim 19, further comprising a fourth routine that provides a user interface through which the user submits the request, wherein the user interface is any one or more of an application programming interface, a mobile device application, a bookmark and share button, and a web browser plugin.

* * * * *